United States Patent
Chan et al.

(10) Patent No.: US 8,837,331 B2
(45) Date of Patent: Sep. 16, 2014

(54) DUPLEXER BYPASS

(75) Inventors: ChunChung Chan, Hong Kong (CN); Alvin Siu-Chung Ng, Hong Kong (CN); Prasad S. Gudem, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/019,893

(22) Filed: Feb. 2, 2011

(65) Prior Publication Data

US 2012/0195237 A1 Aug. 2, 2012

(51) Int. Cl.
*H04B 7/005* (2006.01)
*H04B 1/44* (2006.01)
*H04B 7/06* (2006.01)
*H04B 7/08* (2006.01)
*H04B 1/52* (2006.01)

(52) U.S. Cl.
CPC .............. *H04B 1/44* (2013.01); *H04B 7/0602* (2013.01); *H04B 7/0802* (2013.01); *H04B 1/525* (2013.01)
USPC ........................................................ 370/278

(58) Field of Classification Search
CPC ........ H04B 1/44; H04B 1/525; H04B 7/0802; H04B 7/0602
USPC ................................ 370/276–278; 455/73, 78
See application file for complete search history.

(56) References Cited

U.S. PATENT DOCUMENTS

| | | | |
|---|---|---|---|
| 6,567,653 B1 * | 5/2003 | Sanders | 455/126 |
| 6,987,950 B2 * | 1/2006 | Coan | 455/78 |
| 6,987,956 B2 | 1/2006 | Yoon | |
| 7,715,865 B2 * | 5/2010 | Camp, Jr. | 455/522 |
| 2007/0155344 A1 * | 7/2007 | Wiessner et al. | 455/78 |
| 2008/0153431 A1 | 6/2008 | Haartsen et al. | |
| 2010/0302976 A1 | 12/2010 | Tikka | |

FOREIGN PATENT DOCUMENTS

| | | |
|---|---|---|
| EP | 1684438 A2 | 7/2006 |
| EP | 1887706 A1 | 2/2008 |
| KR | 20060003144 A | 1/2006 |
| WO | WO2009107081 A1 | 9/2009 |

OTHER PUBLICATIONS

International Search Report and Written Opinion—PCT/US2012/023688—ISA/EPO—May 7, 2012.

\* cited by examiner

*Primary Examiner* — Chi Pham
*Assistant Examiner* — Robert Lopata
(74) *Attorney, Agent, or Firm* — Ramin Mobarhan

(57) ABSTRACT

Disclosed are circuits, techniques and methods for implementing a process of selectively bypassing a duplexer in a transmission path. In a particular embodiment, a receiver and a transmitter are coupled to a shared antenna through a duplexer. The duplexer may be selectively bypassed under certain conditions while the receiver is disabled and/or powered off.

20 Claims, 6 Drawing Sheets

# DUPLEXER BYPASS

BACKGROUND

A mobile cellular telephone is typically powered by a battery that carries a limited charge which limits "talk time." An available talk time for a mobile cellular telephone powered by a battery carrying a limited charge may be determined by one or more factors including, for example, underlying technology and/or product design. Talk time may also be affected by a particular communication mode of operation being used by a mobile cellular telephone. For example, a cellular telephone operating in a 2G mode (e.g., Global System for Mobile Communications (GSM)) typically has a longer talk time than a cellular telephone operating in a 3G mode (e.g., Universal Mobile Telecommunications System (UMTS), Wideband Code Division Multiple Access (WCDMA)). As can be observed in FIG. 1, GSM is based on Time Division Multiple Access and each GSM call only occupies a fraction of the available time. Therefore, GSM mobile device can operate in a half-duplex mode (at the physical layer) where time slots for uplink transmission and downlink reception do not overlap while providing a full-duplex voice service to a user subscriber (e.g., allowing the user subscriber to talk and listen simultaneously). In typical implementations, a wireless communication transceiver may be coupled to a single antenna that is shared between transmitter and receiver functions. The advantage of the non-overlapping transmit and receive in GSM is that it may be implemented with only a simple time switch for sharing a single antenna between the uplink transmitter and downlink receiver RF paths. In contrast, as can be observed in FIGS. 2 and 3, UMTS WCDMA operates in a full-duplex mode (at the physical layer) in which time slots for uplink transmission and downlink reception may overlap. As such, a mobile cellular telephone operating in a UMTS WCDMA mode typically employs a duplexer for sharing a common antenna between transmit and receive RF paths. Here, such a duplexer may introduce significant losses in such a transmission path (e.g., up to 3.0 dB) which can be overcome by boosting transmission power. Unfortunately, boosting transmission power while operating in a UMTS WCDMA mode to overcome losses introduced by a duplexer may reduce available talk time for a mobile cellular telephone.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments and is not intended to represent the only embodiments covered by claimed subject matter. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. It will be apparent to those skilled in the art that exemplary embodiments of may be practiced without these specific details. In some instances, well known structures and devices are shown in block diagram form in order to avoid obscuring the novelty of exemplary embodiments presented herein.

As pointed out above, use of a duplexer to enable a single antenna to be shared between transmit and receive functions in a mobile cellular telephone may introduce significant losses resulting in reduced talk time. In one example embodiment, an apparatus comprises a first receiver to receive wireless signals from a first antenna; a transmitter to transmit signals through a second antenna; a second receiver to receive the wireless signals from the second antenna; and a duplexer to allow the transmitter and the second receiver to share the second antenna. In addition, a switch may selectively couple the transmitter to the second antenna while bypassing the duplexer (e.g., while the second receiver is disabled and/or powered off). While the transmitter is coupled to the transmitter through the switch to bypass the duplexer, the first receiver may continue to receive wireless signals. Also, selectively bypassing the duplexer under certain conditions may allow for the reduction of losses that reduce talk time. While the second receiver is disabled and/or powered off and the transmitter is coupled to the second antenna so as to bypass the duplexer, wireless signals received at the first receiver in combination with signals transmitted by the transmitter may enable a continuation of a full-duplex service to a user subscriber.

Figure 1:
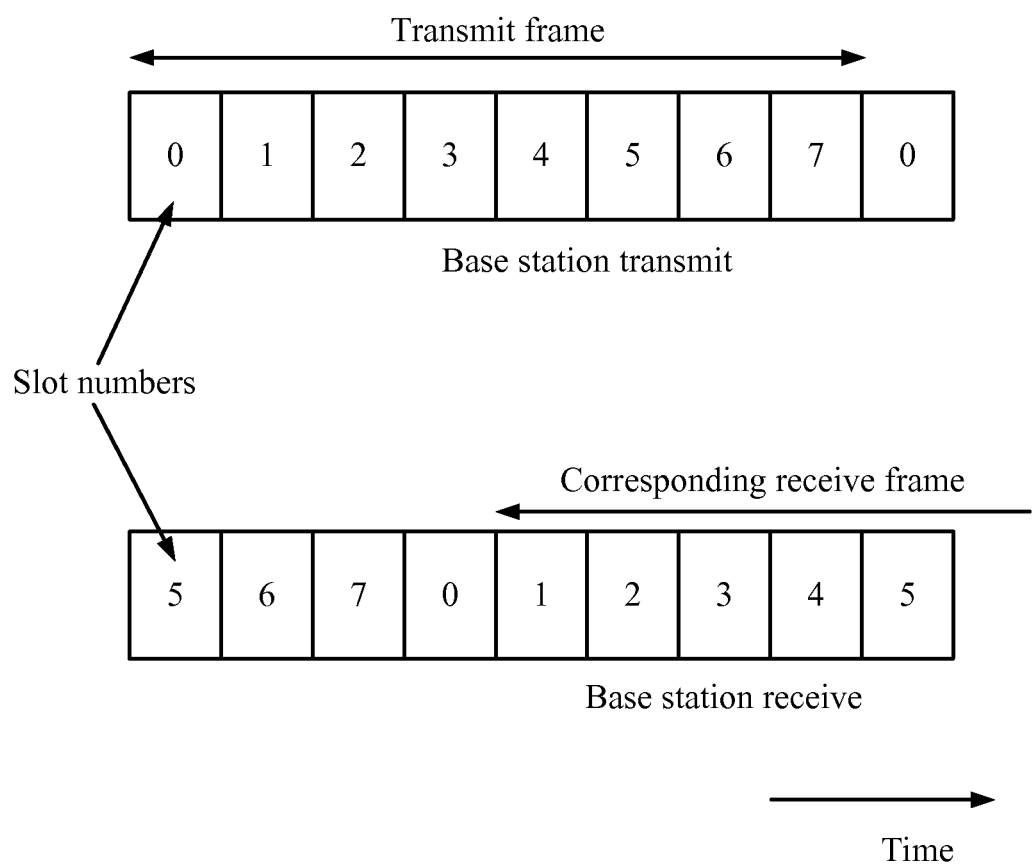
FIG. 1 is a diagram illustrating timing of uplink and downlink slots in a GSM communication system.
Figure 2:
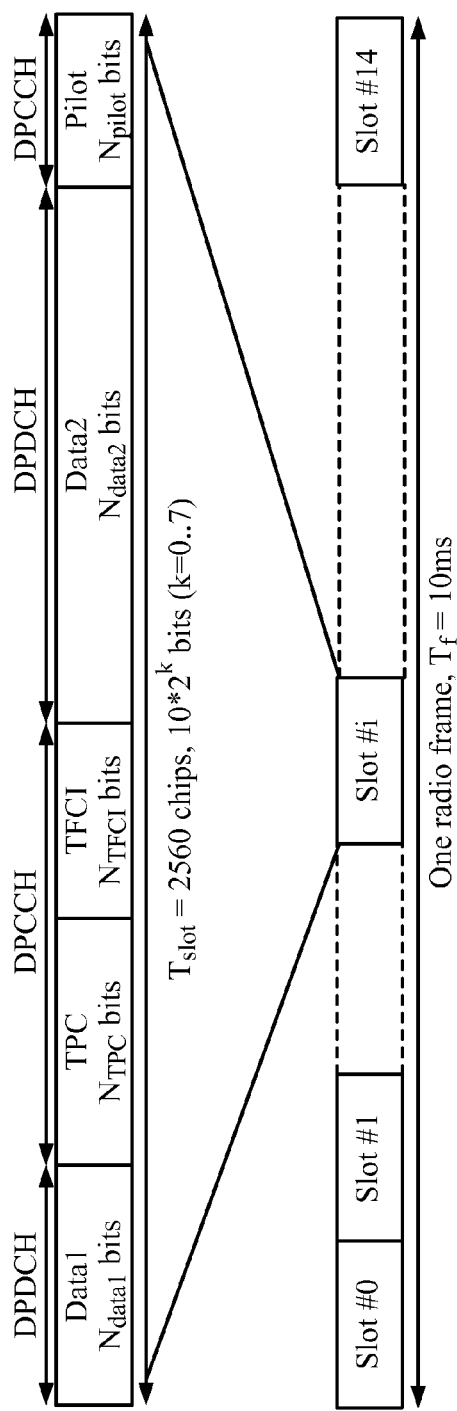
FIG. 2 is a diagram illustrating timing of downlink slots in a UMTS WCDMA communication system.
Figure 3:
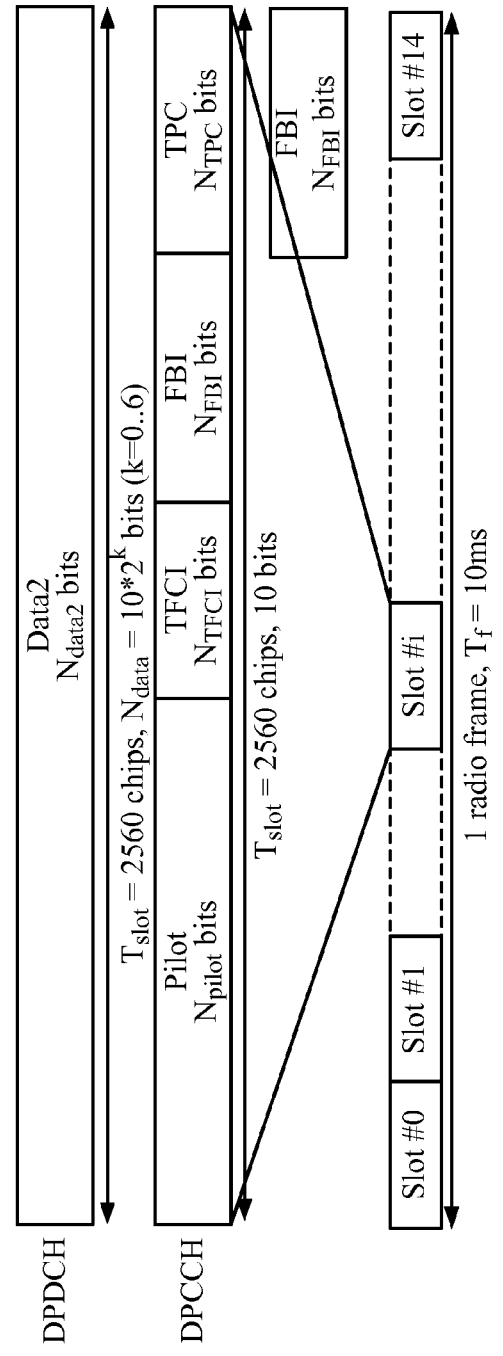
FIG. 3 is a diagram illustrating timing of uplink slots in a UMTS WCDMA communication system.
Figure 4:
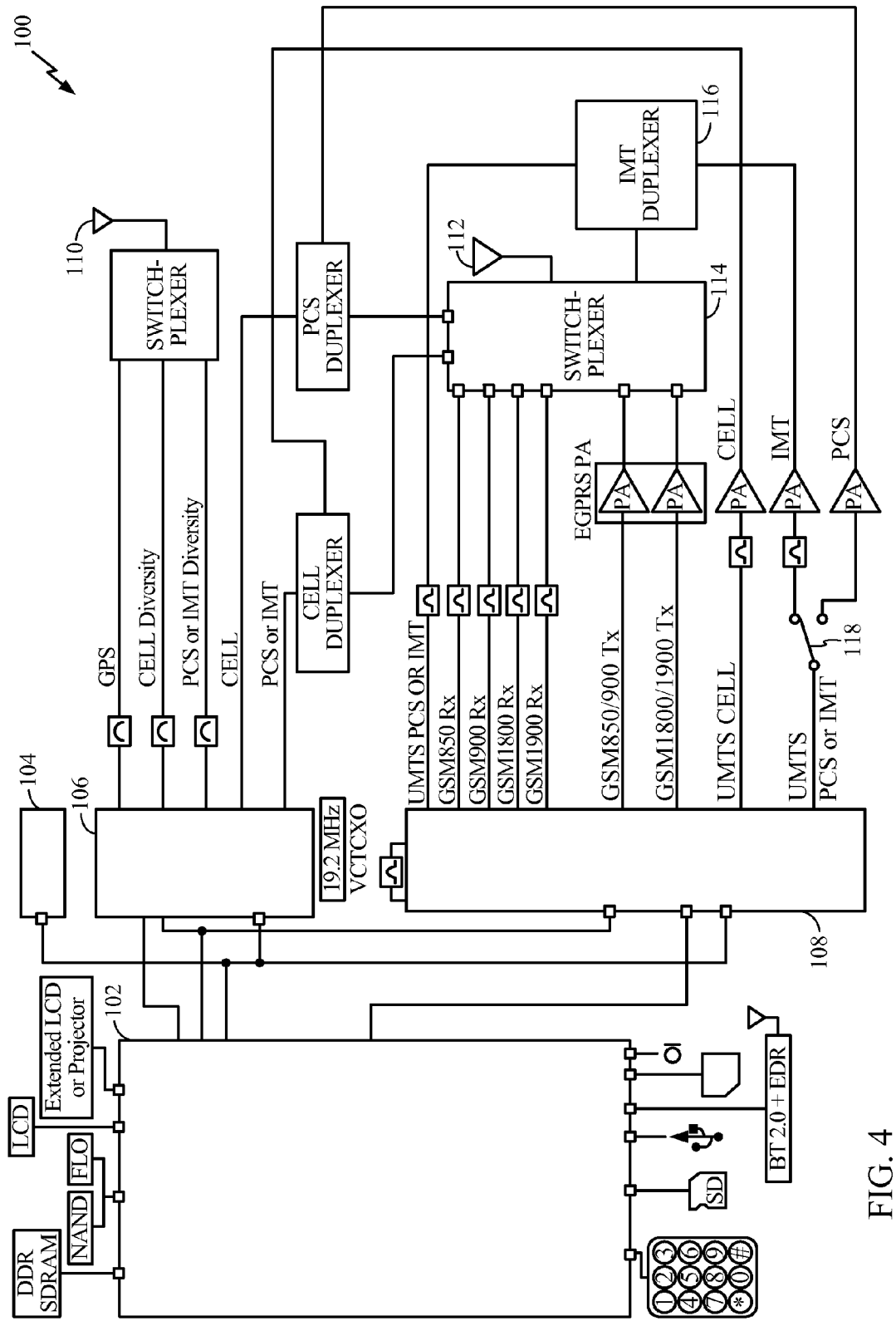
FIG. 4 is a schematic diagram of components in a mobile communication device according to an implementation.

FIG. 4 is a schematic diagram of components 100 in a mobile communication device according to an implementation. Such a mobile communication device may include any one of several device platforms such as, for example, cell phone, personal digital assistant (PDA), laptop computer, etc., just to name a few examples. In particular implementations, such a mobile device may be powered by a battery with a limited charge and provide voice communication capabilities. A mobile applications processor 102 may comprise a central processing unit (CPU) capable of executing machine-readable instructions stored on a non-transitory storage medium such as, for example, random access memory (RAM), non-volatile read-only memory (ROM), just to name a few examples. Mobile applications processor 102 may host an operating system and any one of several mobile application programs including, for example, telephony applications including voice and text messaging services, World Wide Web access, calendaring functions, email, just to name a few examples.

Mobile applications processor 102 may interact with a diversity receiver 106 and a transceiver 108 for receiving and transmitting information in support of one or more applications. A power control module 104 may apply control signals to mobile applications processor 102, diversity receiver 106 and transceiver 108 to control power consumption of these devices according to predefined power states. Diversity receiver 106 is coupled to an antenna to receive signals from any one of several systems including, for example, cellular telephony signals, satellite positioning system (e.g., the global positioning system) signals, signals transmitted in support of Personal Communication Service (PCS) (e.g., operating in a 1900 MHz band) and/or International Mobile Telecommunications (IMT) (e.g., operating in a 2100 MHz band) applications, just to name a few examples.

Figure 5:
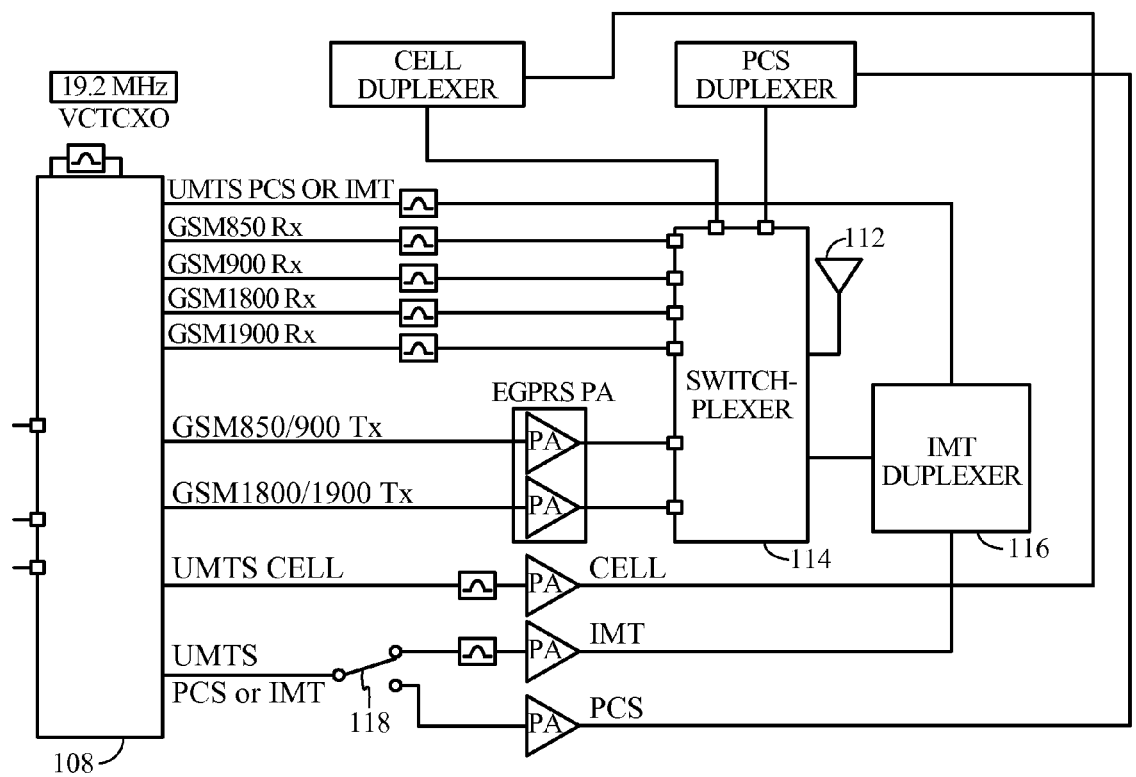
FIG. 5 is a schematic diagram of a transceiver component according to an implementation of the mobile communication device shown in FIG. 4.

In a particular implementation, transceiver 108 may be capable of transmitting information on an uplink and receiving information on a downlink according to one or more wireless communication protocols. As illustrated in FIG. 5, for example, transceiver 108 may perform radio frequency and/or baseband processing to transmit and receive information in multiple modes including GSM, UMTS and/or other modes supporting IMT or PCS through a single antenna 112 using techniques known to those skilled in the art. Here, depending on a particular mode currently being selected, a switchplexer 114 may selectively couple antenna 112 to a receive path and/or transmit path associated with the particular mode. Additionally, in particular modes of operation such as UMTS operating in a PCS band or UMTS operating in an IMT band, duplexer 116 may also decouple transmit and receive RF paths to antenna 112 to, for example, provide adequate isolation between transmit and receive RF paths during full-duplex operation. In this context, full-duplex operation refers to the simultaneous transmission and reception using a common antenna through the use of duplexer. In the particular illustrated implementation of UMTS operating in a PCS band and UMTS operating in an IMT band, such a full-duplex operation may be achieved by frequency division duplexing transmit and receive RF paths to antenna 112 by operating the transmit and receive RF paths on isolated frequency bands. Isolation of the transmit and receive RF paths may be further enhanced with the implementation of duplexer 116. As pointed out above, however, significant losses (e.g., about 3.0 dB) may be incurred in a transmit path that is coupled to antenna 112 through duplexer 116. Here, it should be understood that a service UMTS operating in a PCS band and a UMTS service operating in an IMT band merely illustrate example formats for implementation of a full-duplex operation using frequency division duplexing, and that particular techniques described herein may be applied to other formats, such as WCDMA and other CDMA based formats (e.g., cdma2000), formats according to long term evolution (LTE) (e.g., LTE-FDD) communication systems and other future formats, without deviating from claimed subject matter.

As pointed out above, diversity receiver 106 may process signals received at antenna 110 which are transmitted according to any one of several different formats or protocols. In a particular implementation, diversity receiver 106 may be capable of performing radio frequency and/or baseband processing of signals transmitted on a downlink in support of a UMTS service operating in a PCS band or UMTS service operating in an IMT band using techniques known to those skilled in the art. Here, for example, diversity receiver 106 may operate in combination with transceiver 108 in that diversity receiver 106 may supplement and/or complement a receiving function of transceiver 108. In one particular implementation, diversity receiver 106 and transceiver 108 may each include a dedicated demodulator (not shown) to extract desire information signals using baseband processing. Alternatively, a single demodulator (not shown) implemented in mobile applications processor 102 or elsewhere may be used for demodulating downconverted signals from both diversity receiver 106 and transceiver 108. In one particular implementation, information obtained at diversity receiver 106 from processing signals received at antenna 110 may be combined with information obtained at transceiver 108 from processing signals received at antenna 112 to, for example, improve performance in a low signal-to-noise ratio environment. In another implementation, as described below, in a particular mode of operation (e.g., in support of a UMTS service operating in a PCS band or a UMTS service operating in an IMT band) diversity receiver 106 may obtain information transmitted in a downlink while a corresponding receiving function of transceiver 108 is powered off or disabled.

Figure 6:
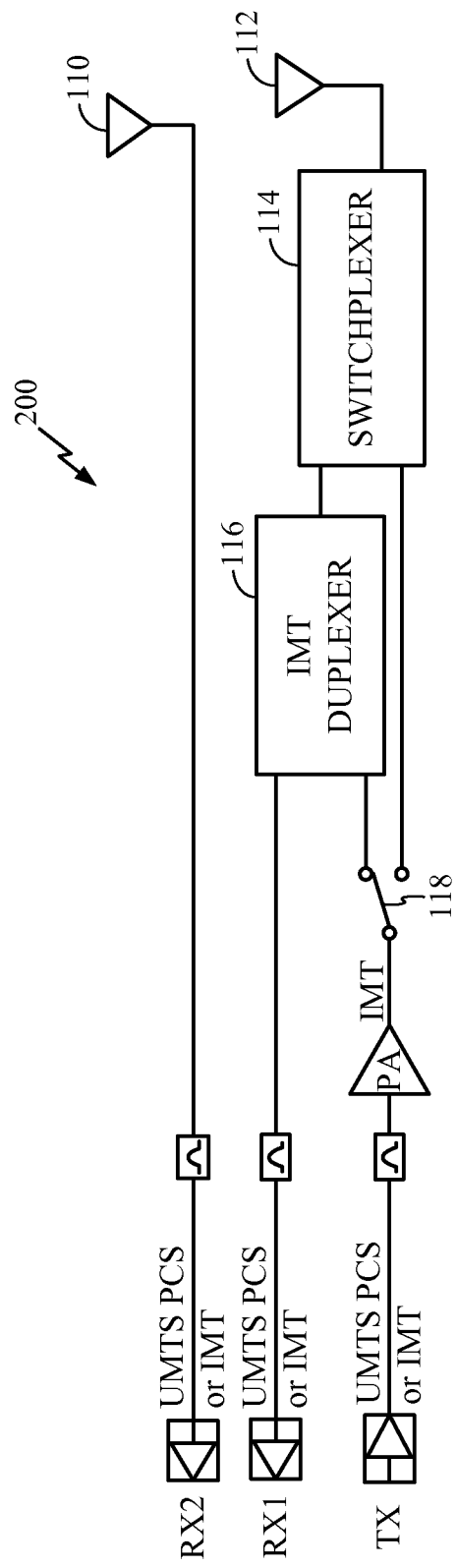
FIG. 6 is a schematic diagram of a circuit for selectively bypassing a duplexer in a transmit path according to an implementation of the transceiver component shown in FIG. 5.

FIG. 6 is a schematic diagram of a circuit 200 for selectively bypassing duplexer 116 in a transmit path according to an implementation of transceiver 108 shown in FIG. 5. A receiver RX2 of diversity receiver 106 is coupled to antenna 110 to process signals received on a downlink in support of a UMTS service. Similarly, a receiver RX1 and transmitter TX of transceiver 108 are coupled to antenna 112 through duplexer 116. As discussed above, coupling transmitter TX to antenna 112 through duplexer 116 for transmission on an uplink may introduce significant losses which may be addressed by boosting transmission power. In a particular implementation, switch 118 may be used to selectively couple transmitter TX directly to antenna 112 bypassing duplexer 116 under certain conditions. While duplexer 116 is bypassed, transmitter TX may reduce transmission power since losses from duplexer 116 will have been avoided. Among other things, duplexer 116 may apply bandpass filtering to increase isolation of signals in the transmit and receive RF paths that share antenna 112. To address a need to remove high frequency noise and harmonics with removal of duplexer 116 from the transmit RF path, a low-loss low pass filter (not shown) may be optionally inserted between switch 118 and switchplexer 114. While such a low-loss low pass filter may impart some losses in the transmit RF path, such losses may be reduced so as to allow reducing transmission power as discussed above.

In a particular implementation, conditions under which transmitter TX may be coupled directly to antenna 112 to bypass duplexer 116 may include, for example, conditions in which receiver RX1 of transceiver 108 may be disabled and/or powered off without significantly degrading service. For example, if receiver RX2 of diversity receiver 106 can obtain sufficient information from a downlink transmission (e.g., for a session on a UMTS, PCS and/or IMT link) from signals received at antenna 110 to provide adequate service, receiver RX1 of transceiver 108 may not be needed for obtaining information from the downlink transmission. Conditions under which transmitter TX may be coupled directly to antenna 112 to bypass duplexer 116 may also include sufficient isolation between antennas 110 and 112 so as to avoid interference from the transmit RF path to antenna 112 leaking into the receive RF path to antenna 110. In a particular implementation, device form factor constraints may limit space available for placement of antennas 110 and 112.

Figure 7:
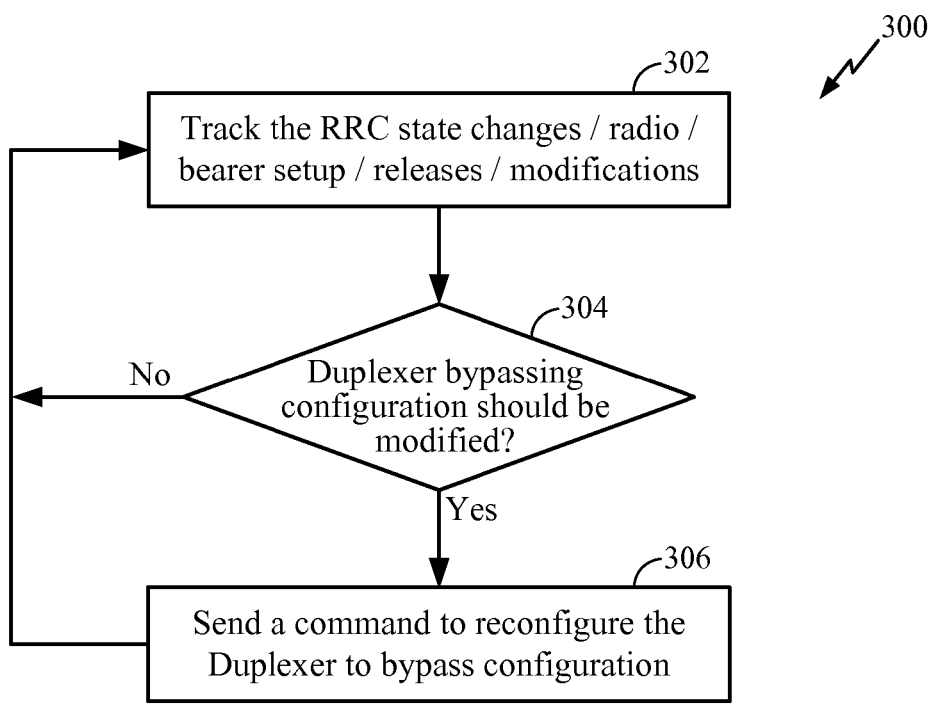
FIG. 7 is a flow diagram of a process for selectively bypassing a duplexer in a transmission path according to an implementation.

FIG. 7 is a flow diagram of a process 300 for selectively bypassing a duplexer in a transmission path according to an implementation. In a particular implementation, process 300 may be performed or controlled through the execution of machine-readable instructions by mobile applications processor 102, a digital signal processor (not shown) and/or circuitry for performing baseband processing (e.g., in transceiver 108). However, these are merely examples of devices which may execute a process for controlling the selective bypass of a duplexer in a transmission path and claimed subject matter is not limited in this respect. At block 302, device battery charge, connection state, application usage, and radio transmission conditions are monitored to determine whether it would be appropriate to activate switch 118 to bypass duplexer 116 according to particular conditions as explained in the particular examples below. While transceiver 108 is operating in a UMTS mode, for example, changes in a state of a radio resource controller (RRC), radio bearer setup, releases and other modifications may be monitored. If at diamond 304 such monitored conditions indicate that duplexer 116 may be bypassed, a command may be issued at block 306 to configure duplexer 116 to be bypassed (e.g., by activating switch 118 and configuring the switchplexer 114).

Figure 8:
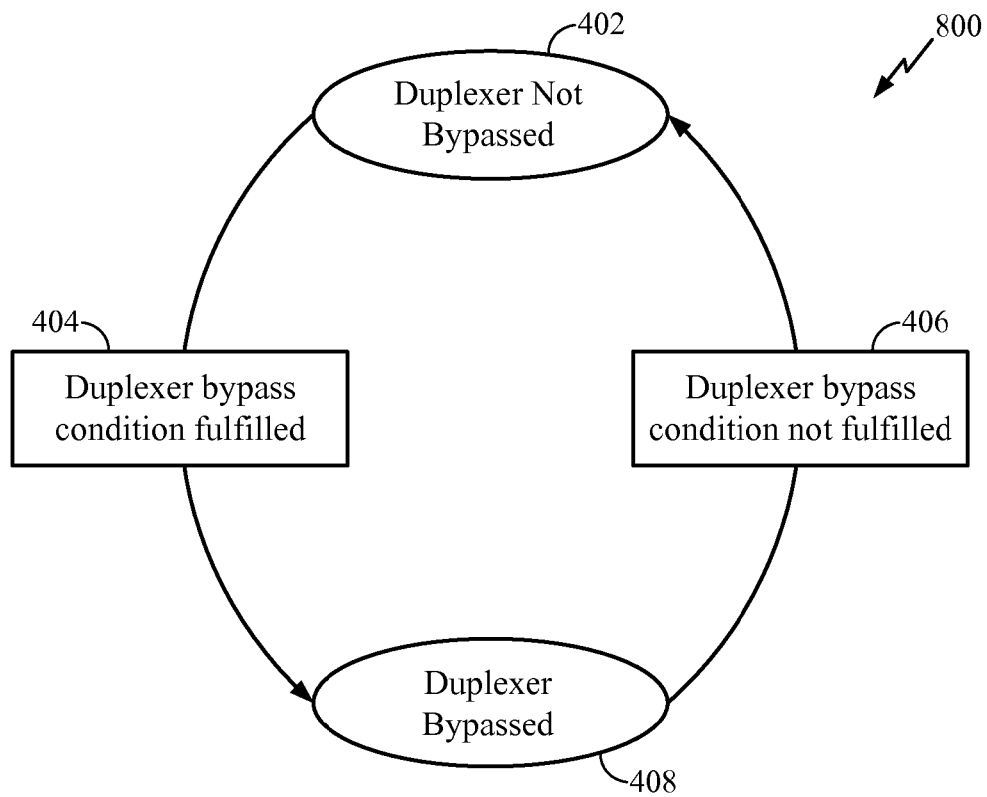
FIG. 8 is a state diagram illustrating transitions between states where a duplexer is bypassed and not bypassed.

FIG. 8 is a state diagram 400 illustrating transitions between states 402 and 408 where a duplexer is bypassed and not bypassed. As illustrated, transitions between states 402 and 408 may occur responsive to certain conditions as determined or detected at diamond 304. One initial duplexer bypass condition at 404 may include active transmission by the device (e.g., while in a connecting or connected mode). Diamond 304 may then consider a particular application that is in use. For example, a circuit-switched application such as voice may entail symmetrical data speed in downlink and uplink. Here, diamond 304 may maintain the device at duplexer bypassed state 408 during such a circuit-switched application while in a connected mode to conserve the limited device battery charge as much as possible. Another example application may be uplink-centric such as an uploading of a large data file. Other conditions for triggering by-passing duplexer 116 applied at diamond 304 may include poor uplink conditions and low remaining battery charge. Uplink transmission power may be significantly reduced while duplexer 116 is by-passed. This provides additional power headroom for devices in poor uplink conditions, in such case the device uplink transmits power is close to the maximum allowed. Duplexer by-pass may be de-activated at diamond 304 under certain conditions 406 if the application in use is downlink-centric (large data file download) or the downlink condition is poor. This allows receive diversity gain (e.g., by combining signals received at receiver RX2 diversity receiver 106 and receiver RX1 of transceiver 108) to improve downlink reception.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may comprise machine-readable instructions residing in a storage medium such as, for example, Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a first receiver to receive wireless signals from a first antenna;
   a transmitter to transmit signals through a second antenna;
   a second receiver to receive the wireless signals from the second antenna;
   a duplexer coupled to the transmitter and the second receiver to allow the transmitter and the second receiver to share the second antenna in a duplex fashion; and
   a switch coupled to the transmitter to selectively couple the transmitter to the second antenna to bypass the duplexer, wherein the wireless signals received at the first receiver in combination with signals transmitted by the transmitter to enable a duplex service.

2. The apparatus of claim 1, wherein the switch is adapted to selectively couple the transmitter to the second antenna while bypassing the duplexer if the second receiver is disabled.

3. The apparatus of claim 1, wherein the duplexer comprises one or more bandpass filters to isolate signals transmitted by the transmitter from signals received by the second receiver.

4. The apparatus of claim 3, and further comprising a low pass filter coupled between the switch and the second antenna while the duplexer is bypassed.

5. The apparatus of claim 1, wherein said apparatus is further adapted to reduce a transmission power by the transmitter in transmitting signals through the second antenna responsive to the transmitter being coupled to the second antenna to bypass the duplexer.

6. The apparatus of claim 1, wherein the transmitter is capable of operating in a mode to support at least one service operating in a CDMA based format.

7. The apparatus of claim 6, wherein the at least one service comprises a UMTS service.

8. A method comprising:
   receiving a first signal from a first antenna at a first receiver;
   transmitting a second signal from a transmitter through a second antenna;
   receiving the first wireless signal from a second antenna at a second receiver, the transmitter and the second receiver being coupled to the second antenna through a duplexer to share the second antenna in a time duplex fashion; and
   selectively coupling the transmitter to the second antenna to bypass the duplexer for transmission in an uplink, wherein the first signal received at the first receiver in combination with the second signal transmitted by the transmitter to enable a duplex service.

9. The method of claim 8, wherein the selectively coupling further comprises selectively coupling the transmitter to the second antenna to bypass the duplexer in response to detection of an application being executed at a mobile device.

10. The method of claim 9, wherein the application being executed comprises an uploading of a file.

11. The method of claim 8, wherein the selectively coupling further comprises selectively coupling the transmitter to the second antenna to bypass the duplexer in response to detection of a condition to conserve battery charge of a device.

12. The method of claim 8, wherein the selectively coupling further comprises selectively coupling the transmitter to the second antenna to bypass the duplexer in response to detection of an uplink condition.

13. The method of claim 8, and further comprising deactivating the bypassing of the duplexer in response to detection of a downlink condition.

14. The method of claim 8, and further comprising disabling or powering down the second receiver while the transmitter is coupled to the second antenna so as to bypass the duplexer.

15. The method of claim 14, and further comprising receiving the first signal from the first antenna at the first receiver simultaneously with transmitting the second signal from the transmitter through the second antenna to enable a full-duplex service.

16. The method of claim 15, wherein the full-duplex service comprises a full-duplex voice service.

17. The method of claim 8, and further comprising combining signals received at the first receiver through the first antenna with signals received at the second receiver through the second antenna.

18. An apparatus comprising:
   means for receiving a first signal from a first antenna at a first receiver;
   means for transmitting a second signal from a transmitter through a second antenna;
   means for receiving the first wireless signal from the second antenna at a second receiver, the transmitter and the second receiver being coupled to the second antenna through a duplexer to share the second antenna in a duplex fashion; and
   means for selectively coupling the transmitter to the second antenna to bypass the duplexer for transmission in an uplink, wherein the first signal received at the first receiver in combination with the second signal transmitted by the transmitter to enable a duplex service.

19. An article comprising:
   non-transitory storage medium comprising machine-readable instructions stored thereon which are executable by one or more processors in a mobile device, the mobile device comprising a first receiver to receive signals from a first antenna, a transmitter to transmit signals through a second antenna and a second receiver to receive signals from the second antenna, to:
   selectively couple the transmitter to the second antenna to bypass a duplexer for transmission in an uplink, wherein the first signal received at the first receiver in combination with the second signal transmitted by the transmitter to enable a duplex service.

20. The article of claim 19, wherein the machine-readable instructions are further executable by the one or more processors to selectively couple the transmitter to the second antenna to bypass the duplexer in response to detection of an application being executed at the mobile device.

* * * * *